(12) United States Patent
Balachandran

(10) Patent No.: US 8,738,525 B2
(45) Date of Patent: May 27, 2014

(54) METHOD AND SYSTEM FOR PROCESSING VEHICULAR VIOLATIONS

(71) Applicant: Rent A Toll, Ltd., Carrollton, TX (US)

(72) Inventor: Sarath K. Balachandran, Irving, TX (US)

(73) Assignee: Rent A Toll, Ltd., Carrollton, TX (US)

( * ) Notice: Subject to any disclaimer, the term of this patent is extended or adjusted under 35 U.S.C. 154(b) by 0 days.

(21) Appl. No.: 13/714,961

(22) Filed: Dec. 14, 2012

(65) Prior Publication Data

US 2014/0019349 A1 Jan. 16, 2014

Related U.S. Application Data

(63) Continuation of application No. 12/577,443, filed on Oct. 12, 2009, now Pat. No. 8,363,899.

(60) Provisional application No. 61/104,471, filed on Oct. 10, 2008.

(51) Int. Cl.
*G06Q 40/00* (2012.01)

(52) U.S. Cl.
USPC .............................................. 705/40; 705/35

(58) Field of Classification Search
USPC ..................................................... 705/35–40
See application file for complete search history.

(56) References Cited

U.S. PATENT DOCUMENTS

| | | | |
|---|---|---|---|
| 4,510,495 A | 4/1985 | Sigrimis et al. | |
| 4,546,241 A | 10/1985 | Walton | |
| 4,665,395 A | 5/1987 | Van Ness | |
| 5,086,389 A | 2/1992 | Hassett et al. | |
| 5,263,118 A | 11/1993 | Cornelison | |
| 5,310,999 A | 5/1994 | Claus et al. | |
| 5,381,155 A | 1/1995 | Gerber | |
| 5,396,417 A | 3/1995 | Burks et al. | |
| 5,485,520 A | 1/1996 | Chaum et al. | |
| 5,525,991 A | 6/1996 | Nagura et al. | |
| 5,602,919 A | 2/1997 | Hurta | |

(Continued)

FOREIGN PATENT DOCUMENTS

| | | |
|---|---|---|
| EP | 0780801 A1 | 6/1997 |
| EP | 0784297 A2 | 7/1997 |
| JP | 2004213569 | 7/2004 |
| JP | 2004227259 A | 8/2004 |

OTHER PUBLICATIONS

U.S. Appl. No. 11/516,380, filed Sep. 6, 2006, Robinson et al.
U.S. Appl. No. 11/516,376, filed Sep. 6, 2006, Robinson.

(Continued)

*Primary Examiner* — Thu Thao Havan
(74) *Attorney, Agent, or Firm* — Winstead PC

(57) ABSTRACT

A method includes receiving paper comprising information regarding a vehicular violation, the information comprising a unique vehicle identifier and a violation classification, extracting from the paper the unique vehicle identifier and the violation classification via automated pattern recognition, uploading the extracted unique vehicle identifier and the violation classification to a database, determining whether the extracted unique vehicle identifier is associated with a predefined plurality of vehicles, responsive to a determination that the unique vehicle identifier is associated with a vehicle of the predefined plurality of vehicles, charging a violation fee for the vehicular violation to a party that was responsible for the vehicle at the time of the vehicular violation, responsive to a determination that the unique vehicle identifier is not associated with the predefined plurality of vehicles, disputing responsibility for the vehicular violation.

19 Claims, 6 Drawing Sheets

(56) References Cited

U.S. PATENT DOCUMENTS

| | | |
|---|---|---|
| 5,805,209 A | 9/1998 | Yuge et al. |
| 5,809,480 A | 9/1998 | Chasek |
| 5,819,234 A | 10/1998 | Slavin et al. |
| 5,825,007 A | 10/1998 | Jesadanont et al. |
| 5,935,190 A | 8/1999 | Davis |
| 5,948,038 A | 9/1999 | Daly |
| 5,991,749 A | 11/1999 | Morrill, Jr. |
| 6,052,068 A | 4/2000 | Price R-W et al. |
| 6,087,963 A | 7/2000 | Kobayashi et al. |
| 6,111,523 A | 8/2000 | Mee |
| 6,163,277 A | 12/2000 | Gehlot |
| 6,175,800 B1 | 1/2001 | Mori et al. |
| 6,181,259 B1 | 1/2001 | Yamashita |
| 6,191,705 B1 | 2/2001 | Oomen et al. |
| 6,195,019 B1 | 2/2001 | Nagura |
| 6,198,913 B1 | 3/2001 | Sung et al. |
| 6,198,987 B1 | 3/2001 | Park et al. |
| 6,218,963 B1 | 4/2001 | Kawanabe et al. |
| 6,233,519 B1 | 5/2001 | Yamada |
| 6,243,029 B1 | 6/2001 | Tomer |
| 6,252,523 B1 | 6/2001 | Mostrom |
| 6,252,524 B1 | 6/2001 | Takikita |
| 6,275,552 B1 | 8/2001 | Ando |
| 6,278,935 B1 | 8/2001 | Kaplan et al. |
| 6,285,858 B1 | 9/2001 | Yoshida |
| 6,300,882 B1 | 10/2001 | Inoue |
| 6,308,893 B1 | 10/2001 | Waxelbaum et al. |
| 6,317,721 B1 | 11/2001 | Hurta et al. |
| 6,326,900 B2 | 12/2001 | DeLine et al. |
| 6,337,639 B1 | 1/2002 | Kojima |
| 6,340,934 B1 | 1/2002 | Hisada |
| 6,342,844 B1 | 1/2002 | Rozin |
| 6,344,806 B1 | 2/2002 | Katz |
| 6,347,739 B1 | 2/2002 | Tamam |
| 6,373,402 B1 | 4/2002 | Mee |
| 6,388,579 B1 | 5/2002 | Adcox et al. |
| 6,390,365 B1 | 5/2002 | Karasawa |
| 6,390,429 B1 | 5/2002 | Brincat |
| 6,396,418 B2 | 5/2002 | Naito |
| 6,411,889 B1 | 6/2002 | Mizunuma et al. |
| 6,437,706 B2 | 8/2002 | Sato et al. |
| 6,446,049 B1 | 9/2002 | Janning et al. |
| 6,449,555 B1 | 9/2002 | Ohba et al. |
| 6,459,385 B2 | 10/2002 | Yamashita |
| 6,463,384 B1 | 10/2002 | Kaplan et al. |
| 6,490,443 B1 | 12/2002 | Freeny, Jr. |
| 6,509,843 B1 | 1/2003 | Fuyama |
| 6,538,580 B2 | 3/2003 | Bostrom et al. |
| 6,542,815 B1 | 4/2003 | Ishizaki et al. |
| 6,546,119 B2 | 4/2003 | Ciolli et al. |
| 6,603,406 B2 | 8/2003 | Jambhekar |
| 6,642,851 B2 | 11/2003 | Deline et al. |
| 6,653,946 B1 | 11/2003 | Hassett |
| 6,658,392 B2 | 12/2003 | Yoshida |
| 6,658,775 B1 | 12/2003 | Lanzisero |
| 6,661,352 B2 | 12/2003 | Tiernay et al. |
| 6,683,580 B2 | 1/2004 | Kuramoto |
| 6,683,956 B1 | 1/2004 | Aikawa et al. |
| 6,684,155 B1 | 1/2004 | Chen et al. |
| 6,705,521 B1 | 3/2004 | Wu et al. |
| 6,725,202 B1 | 4/2004 | Hurta et al. |
| 6,737,986 B2 | 5/2004 | Fuyama |
| 6,744,377 B1 | 6/2004 | Inoue |
| 6,756,915 B2 | 6/2004 | Choi |
| 6,774,810 B2 | 8/2004 | DeLine |
| 6,791,475 B2 | 9/2004 | Yamashita |
| 6,796,499 B1 | 9/2004 | Wang |
| 6,816,707 B1 | 11/2004 | Barker et al. |
| 6,834,267 B1 | 12/2004 | Fuyama |
| 6,856,820 B1 | 2/2005 | Kolls |
| 6,883,710 B2 | 4/2005 | Chung |
| 6,909,876 B2 | 6/2005 | Higashino et al. |
| 6,920,379 B2 | 7/2005 | Miyamoto |
| 6,937,162 B2 | 8/2005 | Tokitsu et al. |
| 6,985,827 B2 | 1/2006 | Williams et al. |
| 7,053,793 B2 | 5/2006 | Tajima et al. |
| 7,080,070 B1 | 7/2006 | Gavarini |
| 7,104,447 B1 | 9/2006 | Lopez et al. |
| 7,970,644 B2 | 6/2011 | Hedley et al. |
| 2001/0019307 A1 | 9/2001 | Sato et al. |
| 2001/0025251 A1 | 9/2001 | Konishi et al. |
| 2001/0026228 A1 | 10/2001 | Naito |
| 2001/0052880 A1 | 12/2001 | Kuramoto |
| 2002/0002534 A1 | 1/2002 | Davis et al. |
| 2002/0004741 A1 | 1/2002 | Yoshida |
| 2002/0008638 A1 | 1/2002 | Yamashita |
| 2002/0018005 A1 | 2/2002 | Fuyama |
| 2002/0032506 A1 | 3/2002 | Tokitsu et al. |
| 2002/0046128 A1 | 4/2002 | Abe et al. |
| 2002/0052837 A1 | 5/2002 | Bouthors |
| 2002/0067291 A1 | 6/2002 | Ikeda |
| 2002/0072963 A1 | 6/2002 | Jonge |
| 2002/0080048 A1 | 6/2002 | Choi |
| 2002/0089431 A1 | 7/2002 | Fuyama |
| 2002/0097178 A1 | 7/2002 | Thomas et al. |
| 2002/0105440 A1 | 8/2002 | Bostrom et al. |
| 2002/0111851 A1 | 8/2002 | Folkers |
| 2002/0115410 A1 | 8/2002 | Higashino et al. |
| 2002/0145039 A1 | 10/2002 | Carroll |
| 2002/0145542 A1 | 10/2002 | Yamashita |
| 2002/0178050 A1 | 11/2002 | Sone |
| 2002/0186144 A1 | 12/2002 | Meunier |
| 2002/0194137 A1 | 12/2002 | Park et al. |
| 2002/0198767 A1 | 12/2002 | Kim |
| 2003/0001755 A1 | 1/2003 | Tiernay et al. |
| 2003/0026430 A1 | 2/2003 | Aikawa et al. |
| 2003/0033083 A1 | 2/2003 | Nakashima et al. |
| 2003/0046145 A1 | 3/2003 | Miao |
| 2003/0050038 A1 | 3/2003 | Haave et al. |
| 2003/0067396 A1 | 4/2003 | Hassett |
| 2003/0069784 A1 | 4/2003 | Banerjee et al. |
| 2003/0105662 A1 | 6/2003 | Koketsu et al. |
| 2003/0109223 A1 | 6/2003 | Toyama |
| 2003/0110075 A1 | 6/2003 | Shioda et al. |
| 2003/0112125 A1 | 6/2003 | Saegrov |
| 2003/0115095 A1 | 6/2003 | Yamauchi |
| 2003/0125981 A1 | 7/2003 | Pedrazzoli Pazos |
| 2003/0189498 A1 | 10/2003 | Kakihara et al. |
| 2003/0200227 A1 | 10/2003 | Ressler |
| 2004/0004120 A1 | 1/2004 | Kojima |
| 2004/0008514 A1 | 1/2004 | Lee et al. |
| 2004/0019412 A1 | 1/2004 | Miyamoto |
| 2004/0046019 A1 | 3/2004 | Kojima |
| 2004/0083130 A1 | 4/2004 | Posner et al. |
| 2004/0140355 A1 | 7/2004 | Grison |
| 2004/0146272 A1 | 7/2004 | Kessel et al. |
| 2004/0153401 A1 | 8/2004 | Gila et al. |
| 2004/0161097 A1 | 8/2004 | Henry |
| 2004/0162788 A1 | 8/2004 | Sakamoto |
| 2004/0174272 A1 | 9/2004 | Lin |
| 2004/0178929 A1 | 9/2004 | Toyama |
| 2004/0206817 A1 | 10/2004 | Grant |
| 2004/0212518 A1 | 10/2004 | Tajima et al. |
| 2004/0227616 A1 | 11/2004 | Lafferty |
| 2004/0236685 A1 | 11/2004 | Gila |
| 2004/0245302 A1 | 12/2004 | McNicholas |
| 2004/0263356 A1 | 12/2004 | Wu et al. |
| 2004/0266500 A1 | 12/2004 | Gila et al. |
| 2005/0005488 A1 | 1/2005 | Burke |
| 2005/0010478 A1 | 1/2005 | Gravelle |
| 2005/0033505 A1 | 2/2005 | Zatz |
| 2005/0034340 A1 | 2/2005 | Burke |
| 2005/0040221 A1 | 2/2005 | Schwarz, Jr. |
| 2005/0071175 A1 | 3/2005 | Gila et al. |
| 2005/0075836 A1 | 4/2005 | Taylor |
| 2005/0097018 A1 | 5/2005 | Takida |
| 2005/0102211 A1 | 5/2005 | Freeny |
| 2005/0116838 A1 | 6/2005 | Bachelder et al. |
| 2005/0119010 A1 | 6/2005 | Yasukawa |
| 2005/0157677 A1 | 7/2005 | Dowling |
| 2005/0159133 A1 | 7/2005 | Hasan et al. |
| 2005/0168351 A1 | 8/2005 | Saze et al. |
| 2005/0168352 A1 | 8/2005 | Tomer |
| 2005/0169227 A1 | 8/2005 | Dowling |

(56) References Cited

U.S. PATENT DOCUMENTS

| | | |
|---|---|---|
| 2005/0169228 A1 | 8/2005 | Dowling |
| 2005/0170824 A1 | 8/2005 | Dowling |
| 2005/0170825 A1 | 8/2005 | Dowling |
| 2005/0179522 A1 | 8/2005 | Saegrov |
| 2005/0187701 A1 | 8/2005 | Baney |
| 2005/0195841 A1 | 9/2005 | Dowling |
| 2005/0195842 A1 | 9/2005 | Dowling |
| 2005/0197976 A1* | 9/2005 | Tuton et al. ............ 705/417 |
| 2005/0198199 A1 | 9/2005 | Dowling |
| 2005/0203892 A1 | 9/2005 | Wesley et al. |
| 2005/0216187 A1 | 9/2005 | Hartinger |
| 2005/0270178 A1 | 12/2005 | Ioli |
| 2005/0279831 A1 | 12/2005 | Robinson et al. |
| 2006/0143104 A1 | 6/2006 | Wagonheim |
| 2006/0237528 A1 | 10/2006 | Bishop et al. |
| 2007/0026842 A1 | 2/2007 | Haave et al. |
| 2007/0124197 A1 | 5/2007 | Robinson et al. |
| 2007/0124198 A1 | 5/2007 | Robinson et al. |
| 2007/0124199 A1 | 5/2007 | Robinson et al. |
| 2007/0126601 A1 | 6/2007 | Park |
| 2007/0192177 A1 | 8/2007 | Robinson et al. |
| 2007/0252678 A1 | 11/2007 | Garcia Alonso et al. |
| 2008/0040210 A1 | 2/2008 | Hedley |
| 2008/0062009 A1 | 3/2008 | Marton |
| 2008/0062472 A1 | 3/2008 | Garg et al. |
| 2008/0077417 A1 | 3/2008 | Lazzarino et al. |
| 2008/0248819 A1 | 10/2008 | Smith et al. |
| 2008/0249936 A1 | 10/2008 | Miller et al. |
| 2008/0270226 A1 | 10/2008 | Archibald |
| 2009/0089156 A1 | 4/2009 | Robinson et al. |
| 2009/0146845 A1 | 6/2009 | Hedley |
| 2009/0195651 A1 | 8/2009 | Leonard et al. |
| 2010/0023452 A1 | 1/2010 | Brown |

OTHER PUBLICATIONS

U.S. Appl. No. 11/651,414, filed Jan. 10, 2007, Robinson et al.
U.S. Appl. No. 11/580,527, filed Oct. 13, 2006, Robinson.
U.S. Appl. No. 11/810,751, filed Jun. 7, 2007, Robinson et al.
U.S. Appl. No. 11/640,550, filed Dec. 18, 2006, Robinson et al.
U.S. Appl. No. 11/640,586, filed Dec. 18, 2006, Robinson et al.
U.S. Appl. No. 11/803,933, filed May 16, 2007, Robinson et al.
U.S. Appl. No. 11/810,752, filed Jun. 7, 2007, Robinson et al.
U.S. Appl. No. 11/985,985, filed Nov. 19, 2007, Robinson et al.
U.S. Appl. No. 11/903,687, filed Sep. 24, 2007, Robinson et al.
U.S. Appl. No. 12/268,680, Balachandran et al.
U.S. Appl. No. 12/437,621, filed May 8, 2009, Robinson et al.
U.S. Appl. No. 12/433,954, filed May 1, 2009, Robinson et al.
U.S. Appl. No. 12/433,479, filed Apr. 30, 2009, Robinson et al.
U.S. Appl. No. 12/437,782, filed May 8, 2009, Robinson et al.
U.S. Appl. No. 13/737,272, filed Jan. 9, 2013, Robinson et al.
"Overview of Meeting Proceedings", 2004 IBTTA Technology Committee, Spring Technology Workshop, Miami, Florida, USA, (4 pages).
Dick Schnacke, "The 5.9 GHZ DSRC Prototype Development Program", IBTTA Technology Workshop, Madrid, Spain, Nov. 14, 2004, (37 pages).
Mehmood, Jennifer, "International Search Report for PCT/US2007/011816" as mailed Jun. 2, 2008 (3 pages).
Young, Lee W."International Search Report for PCT/US 08/10258" as mailed Nov. 10, 2008 (3 pages).
Copenheaver, Blaine R., "International Search Report" for PCT/US2009/060352 as mailed Dec. 10, 2009, (4 pages).
Fernandez, Paneda, J., "Supplementary European Search Report", Nov. 5, 2009, (4 pages).
Astarita, Vittorio et al., "The use of Mobile Phones in Traffic Management and Contol", 2001 IEEE Intelligent Transportation Systems Conference Proceedings, Oakland, CA, Aug. 25-29, 2001, pp. 10-15.
"Toll Ring System; Oslo, Norway", www.eltis.org/studies/leda17.htm; retrieved Dec. 27, 2002 using archive.org., 4 pages.
Yee, Sonya, "Iron Curtain Still Bars the Road East", Oct. 19, 1998, European, p. 18, pp. 1-4.
ProQuest, "Dollar and Thrifty Keep Customers Moving with Pass24(TM)", PR Newswire, New York, Sep. 18, 2006, 2 pages.

\* cited by examiner

METHOD AND SYSTEM FOR PROCESSING VEHICULAR VIOLATIONS

CROSS-REFERENCE TO RELATED APPLICATIONS

This patent application is a continuation of U.S. patent application Ser. No. 12/577,443, filed on Oct. 12, 2009. U.S. patent application Ser. No. 12/577,443 claims priority from U.S. Provisional Patent Application No. 61/104,471, filed on Oct. 10, 2008. U.S. patent application Ser. No. 12/577,443 and U.S. Provisional Patent Application No. 61/104,471 are incorporated herein by reference.

BACKGROUND

1. Technical Field

The invention relates generally to automation of processing of vehicular violations and, more particularly, but not by way of limitation, to automation of processing of vehicular violations involving vehicles operated, for example, by a fleet operator or a rental-car agency.

2. History of Related Art

Third-party entities such as, for example, rental agencies, typically receive notices via standard mail from agencies such as, for example, governmental authorities, toll authorities, or the like regarding vehicular violations incurred by customers. The vehicular violations may include, but are not necessarily limited to, toll violations, parking violations, speeding violations, and the like.

After the notices of the vehicular violations are received, third-party-entity personnel often must manually search rental agreements or other records in order to determine an identity of a customer who was responsible for the violating vehicle at the time the violation occurred. In this way, the customer can be charged for the violation. In other circumstances, the third-party entity may send customer information to the entity from which the vehicular violation notice was received. Processes such as those described above are cumbersome, time-consuming, and expensive.

SUMMARY OF THE INVENTION

A method includes receiving paper comprising information regarding a vehicular violation, the information comprising a unique vehicle identifier and a violation classification, extracting from the paper the unique vehicle identifier and the violation classification via automated pattern recognition, uploading the extracted unique vehicle identifier and violation classification to a database, determining whether the extracted unique vehicle identifier is associated with a predefined plurality of vehicles, responsive to a determination that the unique vehicle identifier is associated with a vehicle of the predefined plurality of vehicles, charging a violation fee for the vehicular violation to a party that vas responsible for the vehicle at the time of the vehicular violation, responsive to a determination that the unique vehicle identifier is not associated with the predefined plurality of vehicles, disputing responsibility for the vehicular violation. The above summary of the invention is not intended to represent each embodiment or every aspect of the present invention.

A computer-program product includes a computer-usable medium having computer-readable program code embodied therein. The computer-readable program code adapted to be executed to implement a method that includes receiving paper comprising information regarding a vehicular violation, the information comprising a unique vehicle identifier and a violation classification, extracting from the paper the unique vehicle identifier and the violation classification via automated pattern recognition, uploading the extracted unique vehicle identifier and the violation classification to a database, determining whether the extracted unique vehicle identifier is associated with a predefined plurality of vehicles, responsive to a determination that the unique vehicle identifier is associated with a vehicle of the predefined plurality of vehicles, charging a violation fee for the vehicular violation to a party that was responsible for the vehicle at the time of the vehicular violation, and responsive to a determination that the unique vehicle identifier is not associated with the predefined plurality of vehicles, disputing responsibility for the vehicular violation.

BRIEF DESCRIPTION OF THE DRAWINGS

A more complete understanding of the method and system of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Embodiment(s) of the invention will now be described more fully with reference to the accompanying Drawings. The invention may, however, be embodied in many different forms and should not be construed as limited to the embodiment(s) set forth herein. The invention should only be considered limited by the claims as they now exist and the equivalents thereof.

Figure 1:
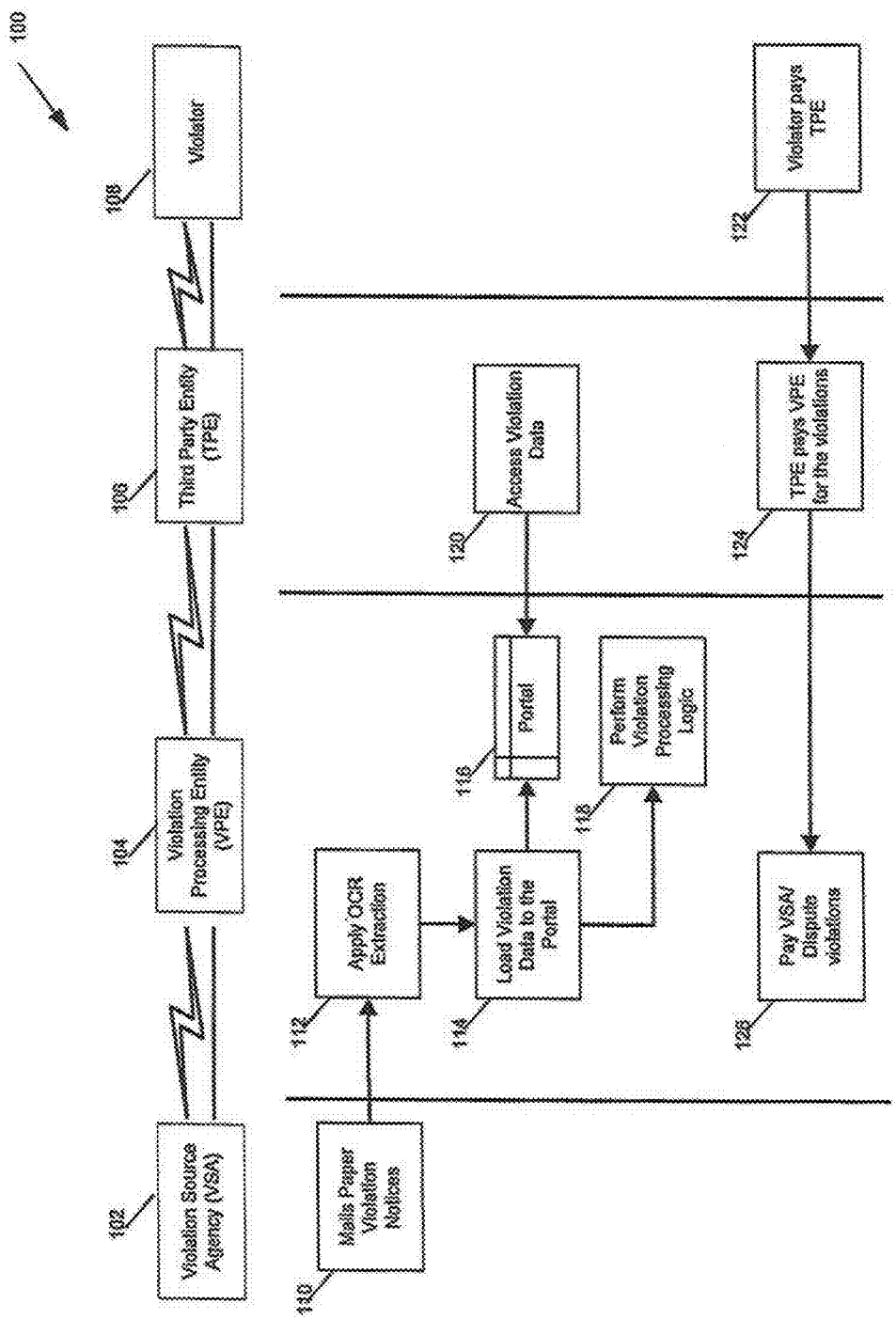
FIG. 1 is a messaging diagram for a vehicular-violation processing system.

FIG. 1 is a messaging diagram for a vehicular-violation processing system. In FIG. 1, a vehicular-violation processing system 100 includes a violation source agency (VSA) 102, a violation processing entity (VPE) 104, a third-party entity 106 (TPE) and a violator 108. As illustrated in FIG. 1, the VPE 104 is interoperably coupled to both the VSA 102 and the TPE 106 and may communicate with each of the VSA 102 and the TPE 106. The TPE 106 and the violator 108 are interoperably coupled to one another and may communicate with each other. In a typical embodiment, the communication between the VSA 102, VPE 104, TPE 106, and the violator 108 may take place using connection oriented or communication less communication protocols such as, for example, HDTP, HDTPS, FTP, FTTS, SOAP, or SSH2.

In a typical embodiment, the VSA 102 may be, for example, an agency issuing vehicular violations. For example, the VSA 102 may be, for example, Dallas Parking Agency, DART, Dallas Police Department, collection agencies, and the like. In a typical embodiment, the VPE 104 may be, for example, an entity for receiving violation data from the VSA 102, performing violation processing logic, and forwarding data to the TPE 106. For example, the VPE 104 acts as a communication channel between the VSA 102 and the TPE 106 for forwarding data from the VSA 102 to the TPE 106 in, for example, real-time, near real-time, or periodic, manner. In a typical embodiment, the TPE 106 may be, for example, a vehicle fleet operator such as, for example, a rental car agency, a vehicle lease agency, and the like. In a typical embodiment, the violator 108 may be, for example, a vehicle operator, a rental vehicle operator, an operator of a leased vehicle at a time when vehicle violation occurred.

Operation of the vehicular-violation processing system 100 will now be described in further detail beginning at step 110. At step 110, the VSA 102 mails paper vehicular violation notices to the VPE 104. The paper vehicular violation notices may be divided into a plurality of classifications. As an example, the paper vehicular violation notices could each be grouped into one of the following categories: first notice; second notice; collection letter; and court notice. At step 112, the VPE 104 applies optical character recognition (OCR) extraction techniques to identify and capture information contained in the paper vehicular violation notices. From step 112, execution proceeds to step 114. At step 114, the VPE 104 loads vehicular violation data obtained via step 112 to a portal 116. The portal 116 typically includes a searchable database and other functionality that permits the vehicular violation data from the paper vehicular violation notices to be processed, matched with violator data and otherwise handled in an automated fashion as will be described in further detail hereinbelow. From step 114, execution proceeds to step 118. At step 118, violation processing logic is performed on the vehicular violation data as well as, for example, rental agreement data also contained on the portal 116.

In addition, the TPE 106 at step 120 accesses the vehicular violation data contained on the portal 116. Moreover, at step 122, the violator pays the TPE 106 for the vehicular violation. In a typical embodiment, the vehicular violation may be, for example, a toll violation, a parking violation, a traffic violation, and the like. In step 124, in response to step 122, the TPE 106 pays the VPE 104 for the vehicular violation. In response to step 124, the VSA 102 is paid by the VPE 104.

In another option, as described in more detail below, the VPE 104 may dispute one or more of the vehicular violations contained in the paper vehicular violation notices 110. In a typical embodiment, upon disputing one or more of the vehicular violations, the VPE 104 is required to provide evidence of non-responsibility for the vehicle at a time of vehicular violation. For example, the evidence of non-responsibility may include, for example, vehicle sale documents, vehicle lease-return documents, and the like. In the embodiment illustrated in FIG. 1, the VPE 104 is a stand-alone unit acting as a communication channel between the VSA 102 and the TPE 106 for performing violation processing logic on data received from the VSA 102 and forwarding to the TPE 106.

Figure 2:
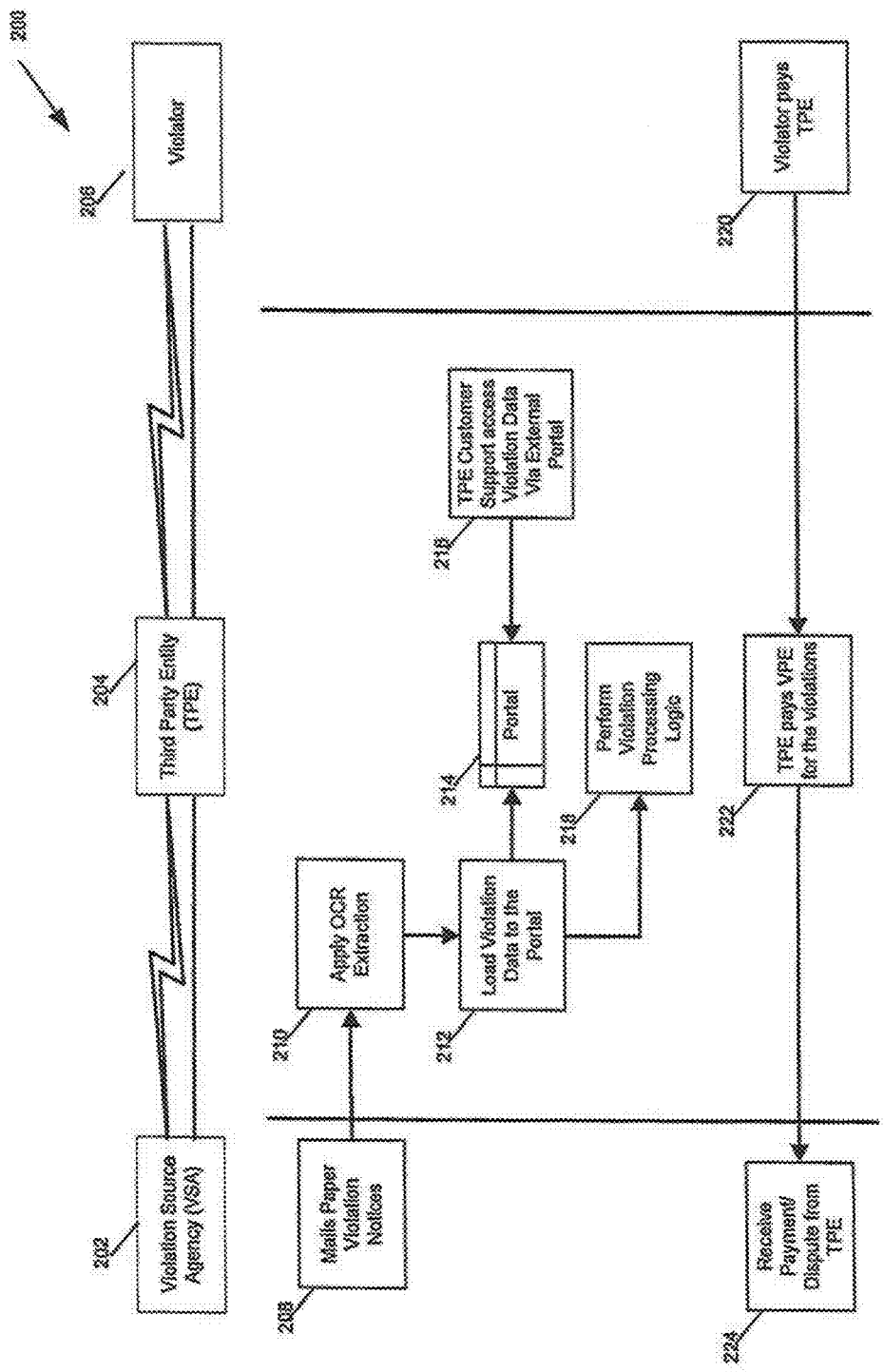
FIG. 2 illustrates a vehicular-violation processing system.

FIG. 2 illustrates a vehicular-violation processing system. In FIG. 2, a vehicular-violation processing system 200 includes a VSA 202, a TPE 204, and a violator 206. The TPE 204 is interoperably coupled to and is in communication with both the VSA 202 and the violator 206. At step 208, the VSA 202 mails paper vehicular violation notices to the TPE 204. The TPE 204 applies OCR extraction techniques at step 210 to the paper vehicular violation notices obtained via step 208. From step 210, execution proceeds to step 212, at which step vehicular violation data obtained via step 210 is loaded to a portal 214.

In a typical embodiment, the portal 214 includes a database onto which the vehicular violation data obtained in step 210 is loaded. The portal 214 may also include rental agreement and other data maintained by the TPE 204. At step 216, the TPE may permit customer support access to the vehicular violation data via the portal 214. At step 218, violation processing logic is performed on the vehicular violation data and possibly on other data on the portal 214. At step 220, the violator 206 pays the TPE 204 for the vehicular violation. In a typical embodiment, the vehicular violation may be, for example, a toll violation, a parking violation, a traffic violation, and the like. Responsive to step 220, the TPE 204 pays the VSA 202 for the vehicular violation. Responsive to step 222, at step 224, the VSA 202 receives payment or a dispute of one or more of the vehicular violations from the TPE 204. In the embodiment illustrated in FIG. 2, the functionality for performing violation processing logic is integrated into an existing operating system of the TPE 204.

Figure 3:
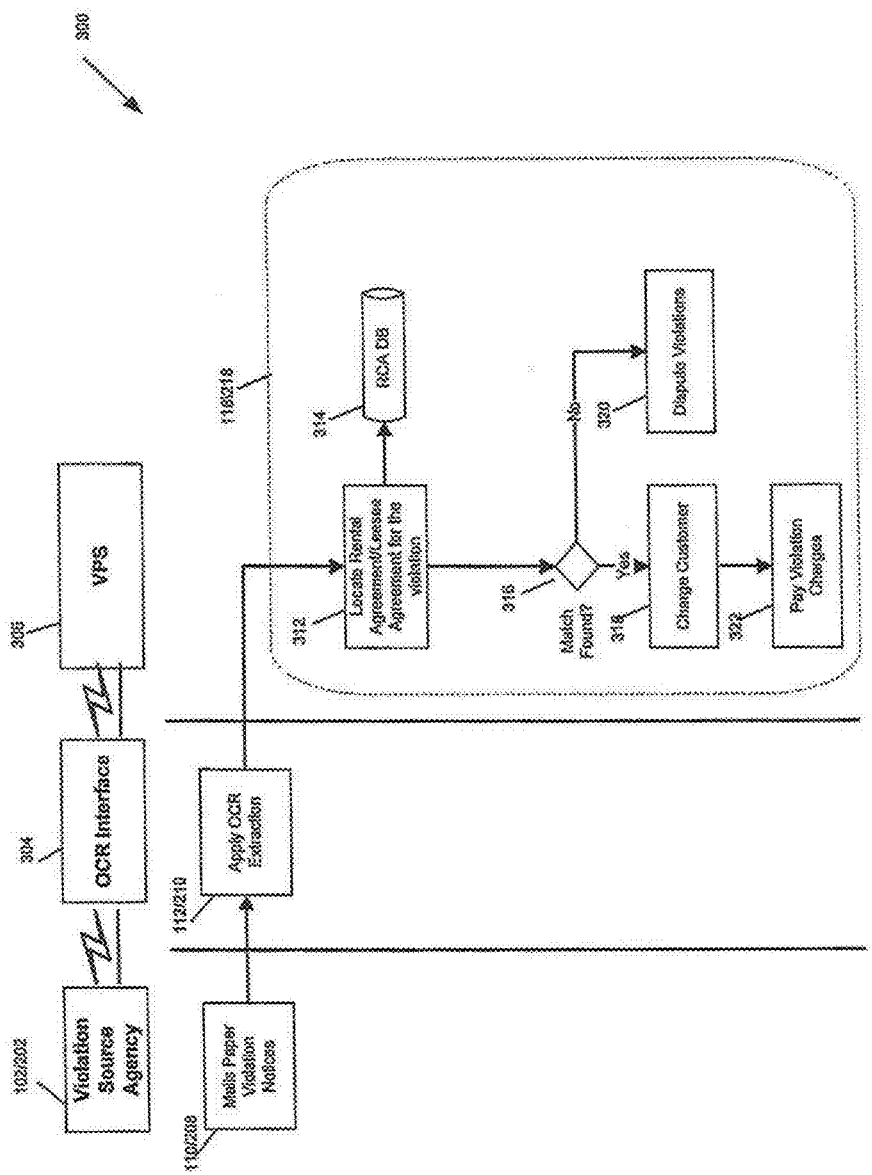
FIG. 3 illustrates in more detail violation processing logic.

FIG. 3 illustrates in more detail violation processing logic. In FIG. 3, a processing system 300 is illustrated. The processing system 300 includes a VSA 102/202 that is interoperably coupled to and is in communication with an OCR interface 304. The OCR interface 304 is interoperably coupled to and in communication with a violation processing system 306. Those having skill in the art will appreciate that the OCR interface may be resident on either the VPE 104 or the TPE 204. In addition, in similar fashion, the VPS 306 is present on either the VPE 104 or the TPE 204. At step 110/208, paper vehicular violation notices are mailed. From step 110/208, execution proceeds to step 112/210, at which step OCR extraction is performed as described relative to FIG. 1 and FIG. 2 above. From step 112/210, execution proceeds to step 118/218.

Further detail relative to an exemplary method for performing the violation processing logic of step 118 or step 218 will now be provided. From step 112/210, execution proceeds to step 312. At step 312, a rental or lessee agreement is located on a rental car agreement (RCA) database 314 using, for example, a unique vehicle identifier. In a typical embodiment, the unique vehicle identifier may be, for example, a license plate number found via OCR extraction of a vehicular violation notice. In a typical embodiment, the RCA database 314 may be, for example, an Oracle™ database, a MS Access™ database, MS SQL, IBM DB2, and the like. From step 312, execution proceeds to step 316. At step 316, if a match is found, execution proceeds to step 318. If a match is not found, execution proceeds to step 320. At step 318, the customer who was responsible for the vehicle at the time of the vehicular violation is charged and, at step 322, the vehicular violation charges are paid via the VPS 306. At step 320, if no match is found, the vehicular violations for which no match was found may be disputed via the VPS 306.

Figure 4:
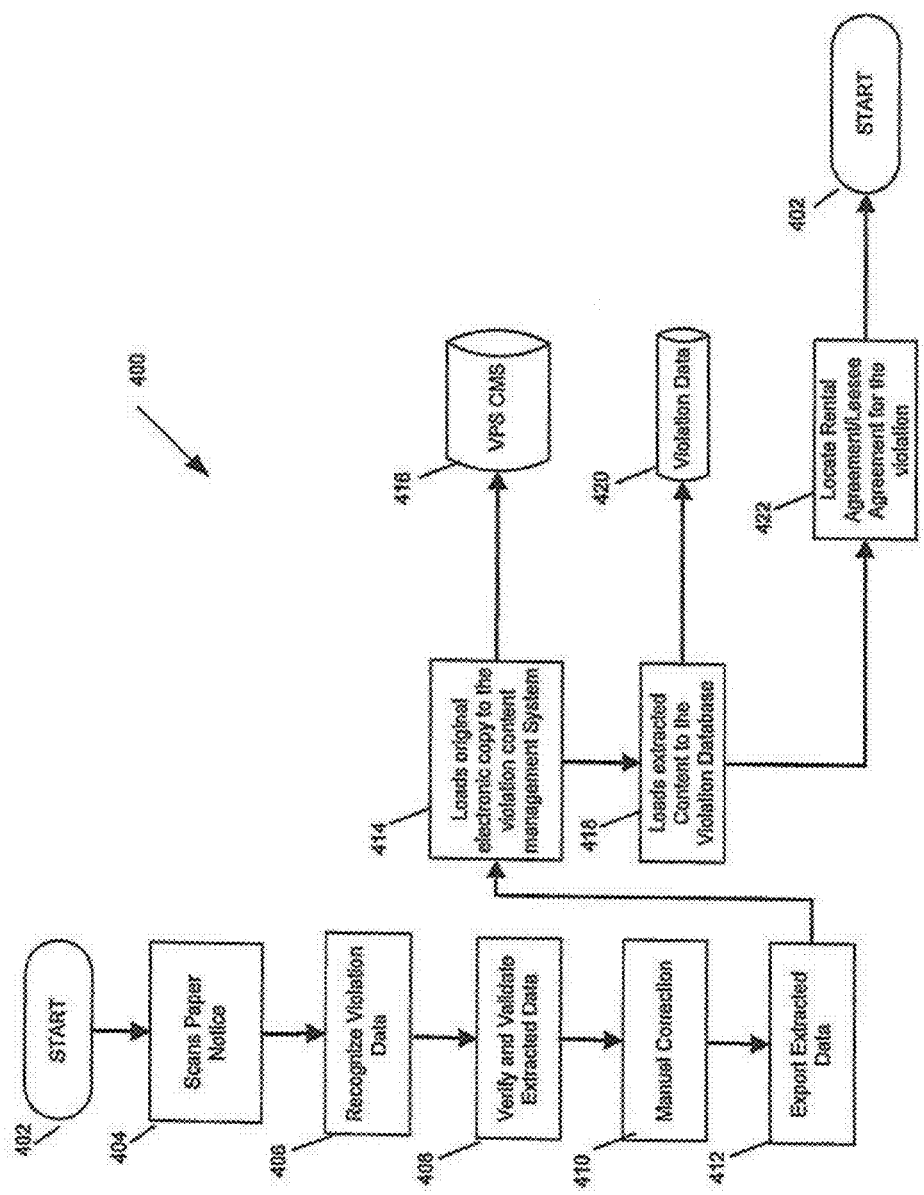
FIG. 4 illustrates in more detail an OCR extraction process.

FIG. 4 illustrates in more detail an OCR extraction process. In FIG. 4, an OCR extraction process 400 is illustrated that could be used, for example, as step 112 or step 210. The OCR extraction process 400 begins at step 402 and proceeds to step 404, at which step a paper vehicular violation notice is scanned. At step 406, vehicular violation data on the paper vehicular violation notice is recognized. At step 408, data extracted at step 406 is verified and validated. At step 410, a manual correction process of extracted data from step 408 is performed. In some embodiments, step 410 might not be performed.

At step 412, the extracted and manually corrected data is exported. At step 414, an original electronic copy of the paper notice of step 404 is loaded to a violation content management system 416. In some embodiments, step 416 might not be performed. At step 418, the extracted content is loaded to a violation database 420. In a typical embodiment, the violation database 420 may be, for example, an Oracle™ database, a MS Access™ database, MS SQL, IBM DB2, and the like. At step 422, a rental or lessee agreement for the violation is located for the violation. At step 424, execution ends.

Figure 5:
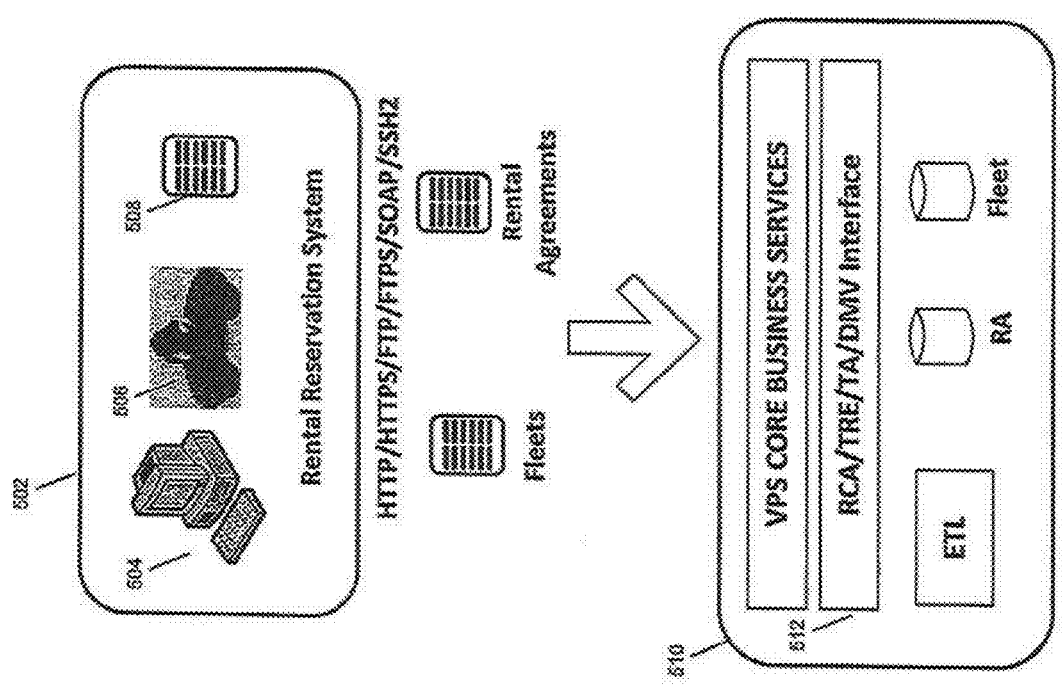
FIG. 5 illustrates communication between a third-party entity and a violation processing entity.

FIG. 5 illustrates communication between a third-party entity (TPE) 502 and a violation processing entity (VPE) 510. The TPE 502 includes information-technology infrastructure 504, vehicles for rent or lease 506, and rental agreements 508. Information regarding a fleet or rental agreement may be communicated to the VPE 510. The VPE 510 includes an interface to one or more of a rental car agreement, toll rental entity, toll authority, or department of motor vehicles 512. Communication between the VPE 510 and the TPE 502 may take place using connection oriented or communication less communication protocols such as, for example, HDTP, HDTPS, FTP, FTTS, SOAP, or SSH2.

Figure 6:
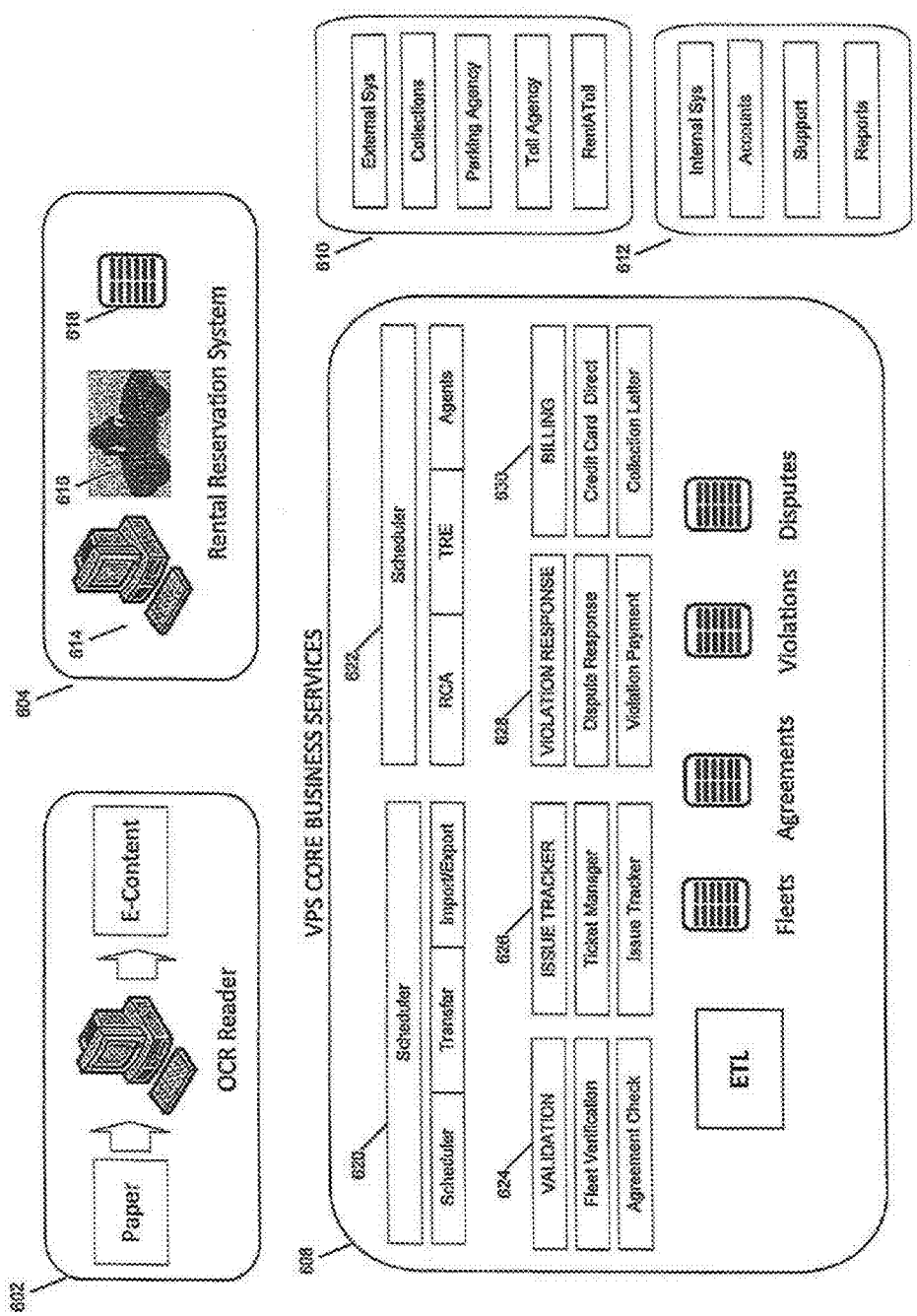
FIG. 6 is a diagram of a violation management system.

FIG. 6 is a diagram of a violation management system 600. The violation management system 600 includes an OCR module 602, a third-party entity (TPE) 604, violation processing entity (VPE) 608, violation source agencies (VSA) 610, and an internal system module 612. In a typical embodiment, the OCR module 602 is operable to use extraction techniques to identify and capture information contained in the paper vehicular violation notices. The extracted information is then communicated to functionality within the VPE 608.

In a typical embodiment, the VPE 608 includes an extract-transform-load (ETL) module 620, a system integrator module 622, a validation module 624, an issue tracker module 626, a violation response module 628, and a billing module 630. In a typical embodiment, the ETL module 620 is operable to create a schedule for the extracted data to be imported form the OCR module 602. Once the data is imported from the OCR module 602 by the ETL module 620, the validation module 624 performs a series of verifications such as, for example, fleet verifications, agreement verifications for the vehicular violation.

The issue tracker module 626 is operable to store each vehicular violation. For example, for every vehicular violation, the issue tracker module 626 generates a separate ticket. In a typical embodiment, the issue tracker module 626 is operable to track and prioritize each vehicular violation.

The violation response module 628 is operable to provide responses to various violation agencies. The violation agencies may be, for example, Dallas Parking Agency, DART, Dallas Police Department, collection agencies, and the like. The violation response module 628 is also operable to set up an automated response to the violation agencies related to the status of vehicular violations issued by the violation, agencies. The billing module 630 is operable to receive payment from the violators.

In a typical embodiment, the system integrator module 622 is operable to interact with the TPE 604 and the VSA 610. In a typical embodiment, the VSA 610 may be, for example, an agency issuing vehicular violations. For example, the VSA 610 may be, for example, Dallas Parking Agency, DART, Dallas Police Department, collection agencies, and the like. In a typical embodiment, the TPE 604 includes customer support infrastructure 614, a rental reservation system 616, and a billing system 618. In a typical embodiment, the billing system may further include, for example, a rental point-of-sale (POS) system, a customer invoice unit, and the like.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising:
by a computer system comprising computer hardware:
receiving paper comprising information regarding a vehicular violation, the information comprising a license plate number and a violation classification;
extracting from the paper the license plate number and the violation classification via an automated extraction technique;
uploading the extracted license plate number and the violation classification to a database;
determining whether the extracted license plate number is associated with a predefined plurality of vehicles;
responsive to a determination that the license plate number is associated with a vehicle of the predefined plurality of vehicles, charging a violation fee for the vehicular violation to a party that was responsible for the vehicle at the time of the vehicular violation; and
responsive to a determination that the license plate number is not associated with the predefined plurality of vehicles, disputing responsibility for the vehicular violation.

2. The method of claim 1, wherein the disputing step comprises providing evidence of non-responsibility for the vehicle at the time of the vehicular violation.

3. The method of claim 2, wherein the evidence of non-responsibility comprises sale documents.

4. The method of claim 2, wherein the evidence of non-responsibility comprises lease-return documents.

5. The method of claim 1, wherein the predefined plurality of vehicles is a plurality of vehicles available for rent by a rental-car agency.

6. The method of claim 5, comprising, responsive to a determination that the license plate number is associated with the vehicle of the predefined plurality of vehicles:
determining whether the vehicle was rented at the time of the vehicular violation;
responsive to a determination that the vehicle was rented at the time of the vehicular violation, identifying a renter of the vehicle at the time of the vehicular violation as the party responsible for the vehicle at the time of the vehicular violation; and
responsive to a determination that the vehicle was not rented at the time of the vehicular violation, identifying the rental-car agency as the party responsible for the vehicle at the time of the vehicular violation.

7. The method of claim 1, comprising paying the violation fee.

8. The method of claim 1, wherein the determining step comprises comparing the license plate number to a plurality of license plate numbers in a database.

9. The method of claim 8, wherein the database comprises rental-car-agreement data of a rental-car agency.

10. The method of claim 6, comprising:
identifying an employee of the rental-car agency who was responsible for the vehicle at the time of the vehicular violation; and
charging the employee the violation fee.

11. The method of claim 1, wherein the vehicular violation is selected from the group consisting of a toll violation, a parking violation, and a traffic violation.

12. The method of claim 1, wherein the violation classification is selected from the group consisting of a first notice, a second notice, a collection letter, and a court notice.

13. The method of claim 1, comprising sorting the vehicular violation among a plurality of vehicular violations by the violation classification.

14. A system for vehicular violations automation, the system comprising:
a first entity for receiving paper comprising information regarding a vehicular violation, the information comprising a license plate number and a violation classification;

a first computer associated with the first entity and adapted for automated pattern recognition for extracting from the paper the license plate number and the violation classification;

a database associated with the first entity and adapted for receiving the license plate number and the violation classification that was extracted by the first computer;

a second computer associated with the first entity and adapted for violation processing logic to determine whether the extracted license plate number is associated with a predefined plurality of vehicles;

wherein the second computer determines whether the license plate number is associated with a vehicle of the predefined plurality of vehicles;

responsive to a determination that the license plate number is associated with a vehicle of the predefined plurality of vehicles, the second computer charges a violation fee for the vehicular violation to a party that was responsible for the vehicle at the time of the vehicular violation; and responsive to a determination that the license plate number is not associated with the predefined plurality of vehicles, the second computer disputes responsibility for the vehicular violation.

15. The system of claim 14, comprising, responsive to a determination that the license plate number is associated with the vehicle of the predefined plurality of vehicles:

the second computer determines whether the vehicle was rented at the time of the vehicular violation;

responsive to a determination that the vehicle was rented at the time of the vehicular violation, the second computer identifies a renter of the vehicle at the time of the vehicular violation as the party responsible for the vehicle at the time of the vehicular violation; and responsive to a determination that the vehicle was not rented at the time of the vehicular violation, the second computer identifies the rental-car agency as the party responsible for the vehicle at the time of the vehicular violation.

16. The system of claim 14, wherein the predefined plurality of vehicles is a plurality of vehicles available for rent by a rental-car agency.

17. The system of claim 14, wherein the vehicular violation is selected from the group consisting of a toll violation, a parking violation, and a traffic violation.

18. The system of claim 14, wherein the disputing step comprises providing evidence of non-responsibility for the vehicle at the time of the vehicular violation.

19. The system of claim 18, wherein the evidence of non-responsibility comprises sale documents.

* * * * *

UNITED STATES PATENT AND TRADEMARK OFFICE
CERTIFICATE OF CORRECTION

PATENT NO. : 8,738,525 B2  Page 1 of 1
APPLICATION NO. : 13/714961
DATED : May 27, 2014
INVENTOR(S) : Sarath K. Balachandran It is certified that error appears in the above-identified patent and that said Letters Patent is hereby corrected as shown below:

In the Specification:

| Patent | Application File |
|---|---|
| Column 1, Line 55 | Replace "to a party that vas responsible" with -- to a party that was responsible -- |

Signed and Sealed this
Twelfth Day of August, 2014

Michelle K. Lee
*Deputy Director of the United States Patent and Trademark Office*